United States Patent
Aoki

(10) Patent No.: US 10,535,377 B2
(45) Date of Patent: Jan. 14, 2020

(54) MAGNETIC DISK DEVICE WITH FIRST AND SECOND WELDED PORTIONS

(71) Applicants: Kabushiki Kaisha Toshiba, Minato-ku, Tokyo (JP); Toshiba Electronic Devices & Storage Corporation, Minato-ku, Tokyo (JP)

(72) Inventor: Kenichiro Aoki, Machida Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 15/907,729

(22) Filed: Feb. 28, 2018

(65) Prior Publication Data

US 2019/0074038 A1    Mar. 7, 2019

(30) Foreign Application Priority Data

Sep. 6, 2017   (JP) ................. 2017-171388

(51) Int. Cl.
   *G11B 33/02*   (2006.01)
   *G11B 33/14*   (2006.01)

(52) U.S. Cl.
   CPC ........ *G11B 33/027* (2013.01); *G11B 33/1486* (2013.01)

(58) Field of Classification Search
   CPC .......... G11B 33/1486; G11B 33/027
   See application file for complete search history.

(56) References Cited

U.S. PATENT DOCUMENTS

| | | | |
|---|---|---|---|
| 2,711,732 A | 6/1955 | Solomon | |
| 3,780,903 A * | 12/1973 | Clarkin | B65D 7/46 220/646 |
| 5,451,742 A * | 9/1995 | Nishio | B23K 26/22 219/121.64 |
| 6,290,015 B1 * | 9/2001 | Horii | B62K 11/04 180/219 |
| 6,762,909 B2 * | 7/2004 | Albrecht | G11B 5/6005 360/236.3 |
| 7,911,732 B2 | 3/2011 | Hatchett et al. | |
| 8,014,167 B2 * | 9/2011 | Gunderson | F16J 15/102 174/250 |
| 9,711,187 B1 * | 7/2017 | Okamoto | G11B 33/1446 |
| 9,747,956 B1 * | 8/2017 | Kaneko | G11B 33/022 |
| 9,779,779 B1 * | 10/2017 | Okamoto | G11B 33/1446 |
| 9,786,330 B1 * | 10/2017 | Usami | G11B 33/027 |
| 9,818,453 B1 * | 11/2017 | Lapp | G11B 33/1486 |

(Continued)

FOREIGN PATENT DOCUMENTS

CN   102867908 A   1/2013
CN   106971744 A   7/2017

(Continued)

*Primary Examiner* — Brian E Miller
(74) *Attorney, Agent, or Firm* — White & Case LLP

(57) ABSTRACT

According to one embodiment, a magnetic disk device includes a rotatable disk-shaped recording medium, a head which processes data on the recording medium and a housing including a base accommodating the recording medium and the head and a cover including a welded portion laser-welded to the base. The welded portion includes a first welded portion welded by a first weld width and a second welded portion welded by a second weld width greater than the first weld width.

13 Claims, 5 Drawing Sheets

(56) References Cited

U.S. PATENT DOCUMENTS

| | | | | |
|---|---|---|---|---|
| 9,823,692 B2* | 11/2017 | Fitzgerald | ................. | G06F 1/16 |
| 10,020,027 B2* | 7/2018 | Okamoto | ........... | G11B 33/1446 |
| 2003/0184075 A1 | 10/2003 | Freeman et al. | | |
| 2005/0068666 A1* | 3/2005 | Albrecht | ............ | G11B 33/1466 |
| | | | | 360/99.18 |
| 2008/0165448 A1* | 7/2008 | Ichikawa | ............. | G11B 25/043 |
| | | | | 360/97.22 |
| 2008/0310048 A1* | 12/2008 | Hirono | ............... | G11B 33/1466 |
| | | | | 360/97.16 |
| 2013/0010412 A1 | 1/2013 | Shiraki et al. | | |
| 2013/0222947 A1* | 8/2013 | Sugii | ................... | G11B 23/505 |
| | | | | 360/99.08 |
| 2015/0332733 A1* | 11/2015 | Lapp | ....................... | H02K 5/12 |
| | | | | 360/99.08 |
| 2017/0369236 A1* | 12/2017 | Goad | .................... | B65D 90/04 |

FOREIGN PATENT DOCUMENTS

| | | |
|---|---|---|
| JP | 5049017 B2 | 10/2012 |
| JP | 2013-220462 A | 10/2013 |

* cited by examiner

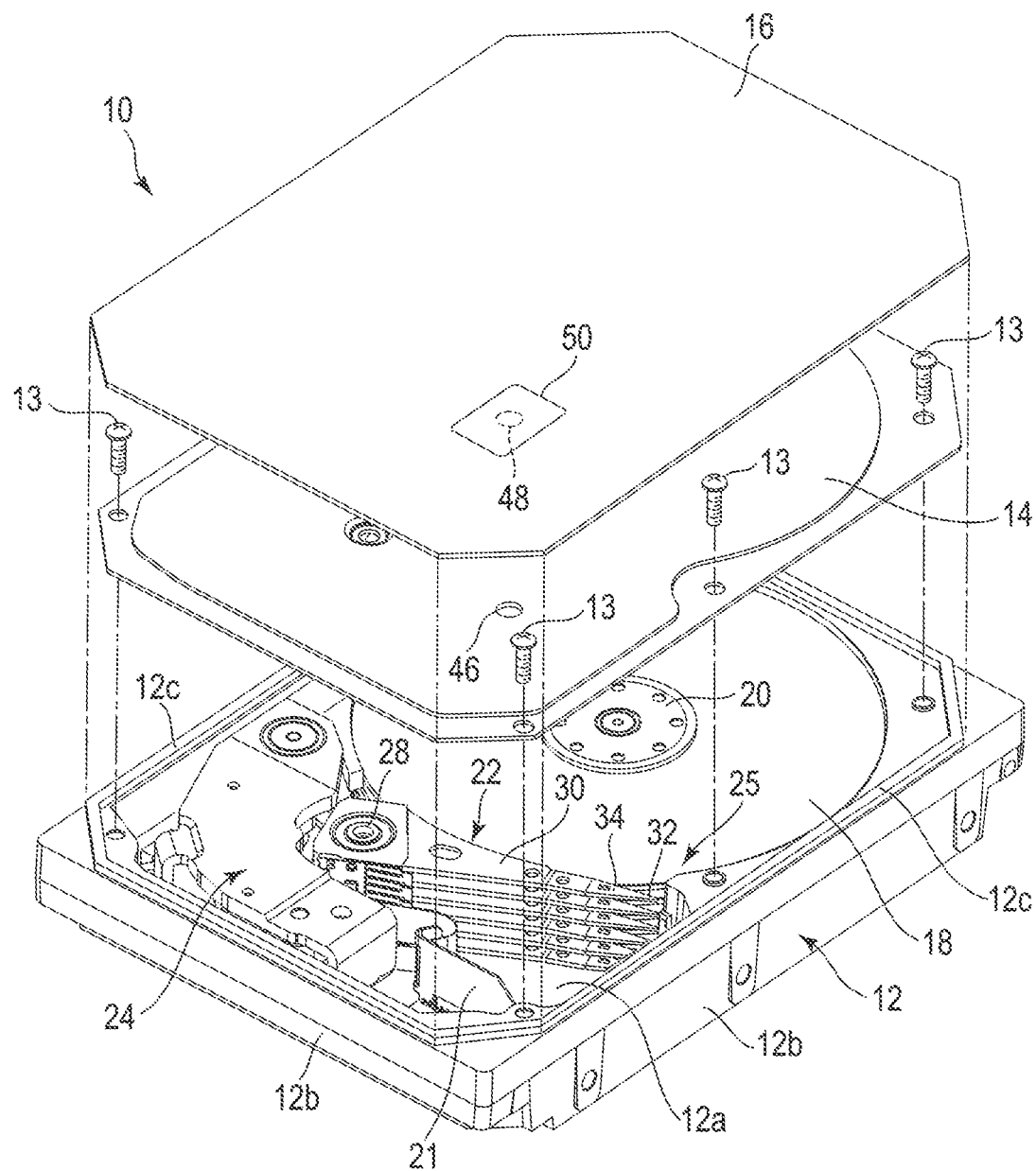
F I G. 2

MAGNETIC DISK DEVICE WITH FIRST AND SECOND WELDED PORTIONS

CROSS-REFERENCE TO RELATED APPLICATIONS

This application is based upon and claims the benefit of priority from Japanese Patent Application No. 2017-171388, filed Sep. 6, 2017, the entire contents of which are incorporated herein by reference.

FIELD

Embodiments described herein relate generally to a magnetic disk device.

BACKGROUND

As a disk device, a magnetic disk drive is known, which comprises a housing including a base and a top cover and accommodating therein a rotatable magnetic disk and an actuator which supports a magnetic head. Further, such a method of improving the performance of a disk drive has been proposed, that the housing is sealed with a low-density gas such as helium so as to reduce the rotation resistance of the magnetic disk and the magnetic head.

In such a magnetic disk drive, the top cover is jointed to the base of the housing by laser welding to form an enclosed housing and increase the airtightness of the housing. The laser welding is carried out on along an entire outer circumference of the top cover. Here, in order to obtain high airtightness, it is necessary to maintain a stable welding quality all around the circumference.

In the above-described disk drive, the welded portion between the base and the cover is formed along the outer circumference of the cover, and thus the welded portion is uncovered to the surrounding of the device. When handling the disk drive, for example, when the disk drive is inserted to or removed from the support rack, the welded portion may be brought into contact with the support rack. In order to prevent the fracture of the welded portion by such contact, the strength of the welded portion should preferably be enhanced.

BRIEF DESCRIPTION OF THE DRAWINGS

FIG. 2 is an exploded perspective view of the HDD according to the first embodiment.

DETAILED DESCRIPTION

Figure 1:
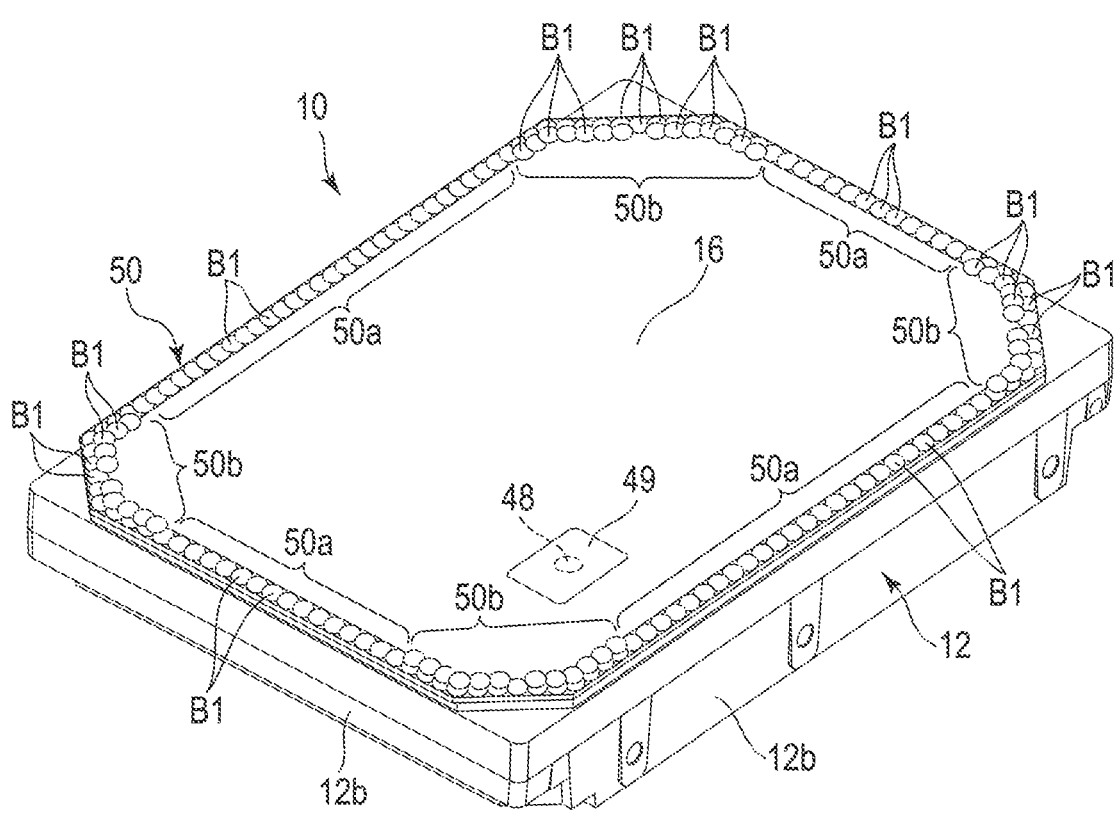
FIG. 1 is a perspective view showing an appearance of a hard disk drive (HDD) according to the first embodiment.

Various embodiments will be described hereinafter with reference to the accompanying drawings. In general, according to one embodiment, a magnetic disk device comprises a rotatable disk-shaped recording medium, a head which processes data on the recording medium and a housing including a base accommodating the recording medium and the head and a cover including a welded portion laser-welded to the base. The welded portion includes a first welded portion welded by a first weld width and a second welded portion welded by a second weld width greater than the first weld width.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

First Embodiment

As an example of the disk device, a hard disk drive (HDD) according to an embodiment will now be described in detail. FIG. 1 is a perspective view showing the appearance of an HDD according to a first embodiment, and FIG. 2 is an exploded perspective view showing an internal structure of the HDD.

As shown in FIGS. 1 and 2, the HDD comprises a substantially rectangular housing 10. The housing 10 comprises a rectangular box-shaped base 12 an upper surface of which is opened, an inner cover 14 screwed to the base 12 with a plurality of screws 13 to close the opening of the upper end of the base 12, an outer cover (top cover) 16 overlaid on the inner cover 14 and including a circumferential portion welded to the base 12. The base 12 includes a rectangular bottom wall 12a opposing the inner cover 14 with a gap therebetween and side walls 12b provided to stand along the periphery of the bottom wall, which are molded into one body with, for example, aluminum. On upper end surfaces of the side walls 12b, a substantially rectangular frame-shaped fixing rib 12c is provided to project therefrom.

The inner cover 14 is formed from, for example, stainless steel into a rectangular plate. The circumferential portion of the inner cover 14 is screwed to the upper surfaces of the side walls 12b of the base 12 with the screws 13, and thus fixed to an inner side of the fixing rib 12c. The outer cover 16 is formed from, for example, aluminum into a rectangular plate. The outer cover 16 has dimensions slightly larger than those of the inner cover 14. The circumferential portion of the outer cover 16 is welded to the fixing rib 12c of the base 12 over its entire circumference, to be airtightly fixed to the base 12. The welded structure will be described in detail later.

Vents 46 and 48 to communicate the outside and inside of the housing 10 with each other are formed in the inner cover 14 and the outer cover 16, respectively. The air in the housing 10 is discharged through the vents 46 and 48 and then a low-density gas (inert gas) having a density lower than that of air, for example, helium is introduced through the vents 46 and 48 and enclosed or sealed in the housing 10.

For example, a seal (sealing member) 49 is stuck on the outer surface of the outer cover 16 so as to close the vent 48.

As shown in FIG. 2, the housing 10 accommodates therein a plurality of magnetic disks 18 as recording media and a spindle motor 20 as a drive section, which supports and rotates the magnetic disks 18. The spindle motor 20 is placed on the bottom wall 12a. Each of the magnetic disks 18 includes a magnetic recording layer on the upper and/or lower surface thereof. The magnetic disks 18 are engaged coaxially with a hub (not illustrated) of the spindle motor 20, and are clamped with a clamp spring to be fixed to the hub. The magnetic disks 18 are supported and situated parallel to the bottom wall 12a of the base 12. The magnetic disks 18 are rotated at a predetermined number of revolutions with the spindle motor 20.

As shown in FIG. 2, for example, five magnetic disks 18 are accommodated in the housing 10 in this embodiment, but the number of magnetic disks 18 is not limited to this. Or a single magnetic disk 18 may be accommodated in the housing 10.

In the housing 10 are provided a plurality of magnetic heads 32 which write/read data on/from the magnetic disks 18, a head stack assembly (actuator) 22 which supports the magnetic heads 32 movably with respect to the magnetic disks 18. In the housing 10 are further provided a voice coil motor (to be referred to as VCM) 24 which rotates and aligns the head stack assembly 22, a ramp load mechanism 25 which retains the magnetic heads 32 in an unload position spaced from the magnetic disks 18 when the magnetic heads 32 moved to the outermost circumference of the magnetic disks 18, and a board unit 21 on which electronic components including a conversion connector and the like are mounted.

The head stack assembly 22 comprises a rotatable bearing unit 28, a plurality of arms 30 extending from the bearing unit 28, and a plurality of suspensions 34 extending from the respective arms 30, and a magnetic head 32 is supported on a distal end of each suspension 34.

A printed circuit board (not shown) is attached to an outer surface of the bottom wall 12a of the base 12. The printed circuit board controls operations of the spindle motor 20, and also the VCM 24 and the magnetic heads 32 via the substrate unit 21.

Figure 3:
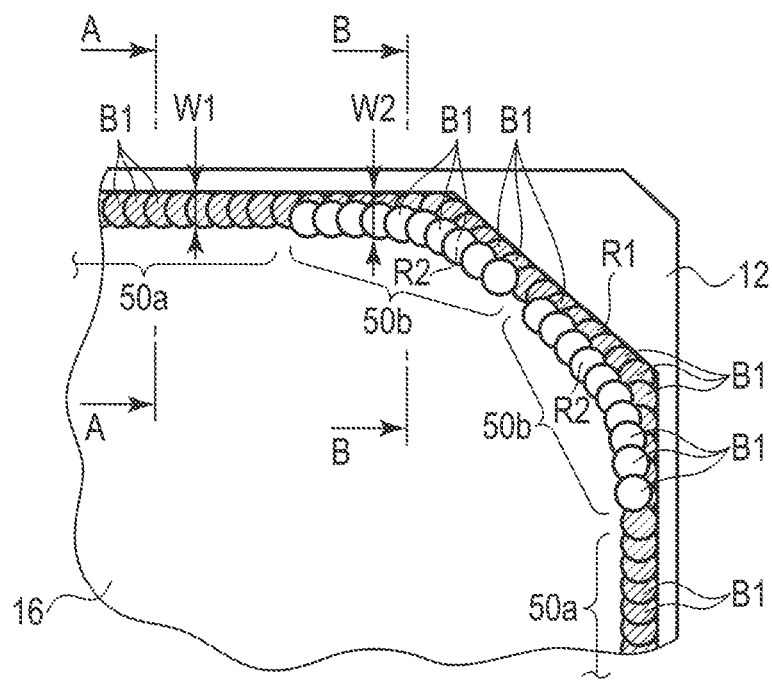
FIG. 3 is a plan view showing a part of the welded portion of the HDD.
Figure 4:
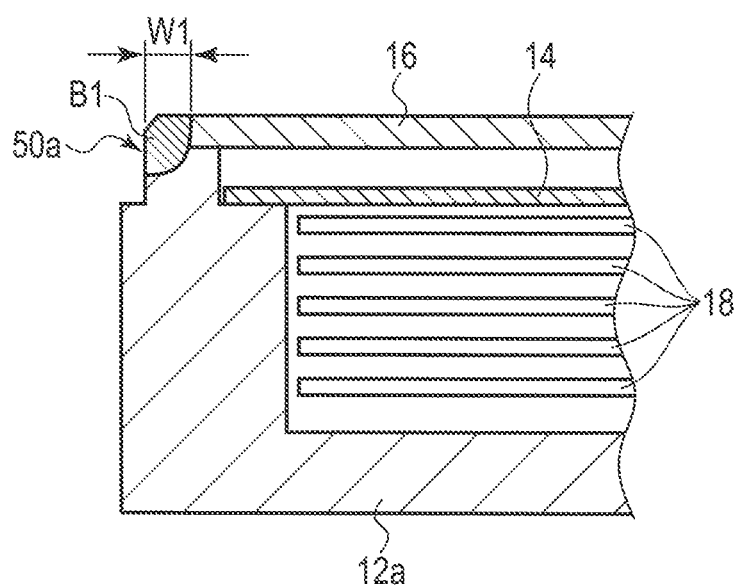
FIG. 4 is a cross sectional view of the HDD taken along line A-A in FIG. 3.
Figure 5:
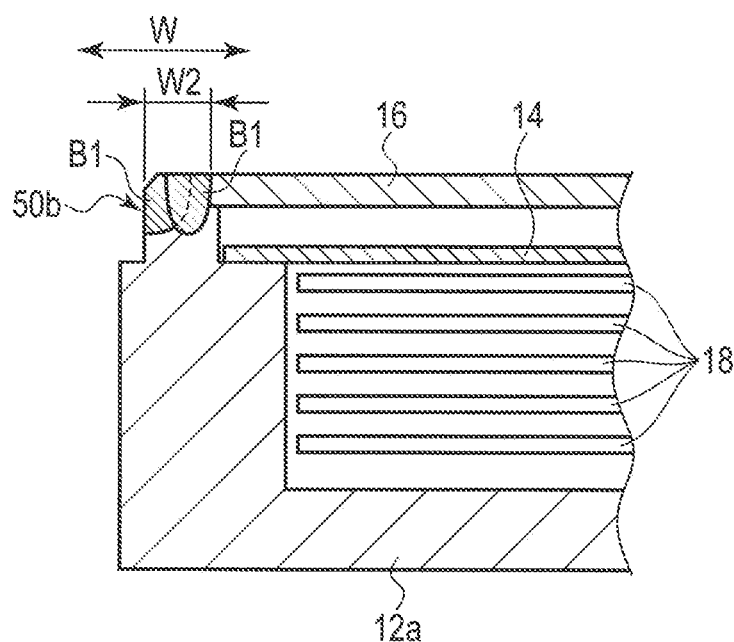
FIG. 5 is a cross section of the HDD taken along line B-B in FIG. 3.

Next, the structure of the welded portion of the HDD and a method of manufacturing the HDD (a welding method) will be described in detail. FIG. 3 is a plan view showing a part of the welded portion of the HDD. FIG. 4 is a cross sectional view of the HDD taken along line A-A in FIG. 3. FIG. 5 is a cross section of the HDD taken along line B-B in FIG. 3.

As shown in FIGS. 1 and 3, the circumferential portion of the outer cover 16 is welded to the rib 12c of the base 12, thus forming a frame-shaped welded portion 50 formed along its entire circumference. The welded portion 50 includes a first welded portion 50a having a first weld width W1 and a plurality of second welded portions 50b each having a second weld width W2 greater than the first weld width W1. In this embodiment, the second welded portions 50b are provided respectively in four corner portions of the outer cover 16. The other regions of the welded portion 50, for example, a central portion of each long side and a central portion of each short side are formed as the first welded portion 50a. As shown in FIGS. 3 and 4, the first welded portion 50a is formed of a plurality of weld beads B1, e.g., circular weld beads, each having a first weld with (first diameter) W1 and arranged to partially overlap each other. As shown in FIGS. 3 and 5, each of the second welded portions 50b is formed of a first weld bead row R1 and a second weld bead row R2. The first weld bead row R1 includes a plurality of circular weld beads B1 each having a first weld with (first diameter) W1 and arranged to partially overlap each other. The second weld bead row R2 includes a plurality of weld beads B1, e.g., circular weld beads, each having a first weld with (first diameter) W1 and arranged to partially overlap each other. At least a part of the second weld bead row R2 overlaps with the first weld bead row R1. The second weld bead row R2 is arranged in a position shifted to an inner side of the first weld bead row R1 in its width direction.

As shown in FIG. 3, in the corner portions of the outer cover 16, the first weld bead row R1 extends in a straight line along an outer edge of the outer cover 16, except for the bent portions. The second weld bead row R2 is arranged to be slightly curved in an arc shape in the corner portions of the outer cover 16.

Next, an example of a method of manufacturing the HDD configured as above will be described.

First, the spindle motor 20, the magnetic disks 18, the head stack assembly 22 and other structural components are incorporated and installed on the base 12 of the housing 10 in, for example, a clean room. Then, the inner cover 14 is placed on the base 12 and fixed to the base 12 with the screws 13 to close the opening of the base 12. Then, the outer cover 16 is installed to be overlaid on the inner cover 14 so as to align with the fixed rib 12c. Subsequently, a laser beam irradiation device (radiation optical head) (not shown) is used to laser-weld the outer cover 16. The laser beam irradiation device irradiates a laser beam of a predetermined diameter onto a predetermined position of the outer cover 16 to regionally fuse the outer cover 16 and weld it to the base (fixed rib) 12. By the welding, the outer cover 16 is regionally fused and solidified to form circular weld beads B1 having a predetermined diameter on an outer circumferential portion of the outer cover 16.

In the welding process, a laser beam is irradiated to the circumferential portion of the outer cover 16 by the laser beam irradiation device while moving the housing 10 or the laser beam irradiation device in the X direction and the Y direction as required, and thus the circumferential portion of the outer cover 16 is laser-welded continuously all around its circumference. In the first round of laser welding, the laser beam irradiation device repeats ON/OFF of laser output to irradiate the laser beam in pulses, thereby scanning the peripheral portion of the outer cover 16 at a predetermined scanning speed. Thus, a plurality of circular weld beads B1 are formed along the periphery of the outer cover 16. Each of the weld beads B1 is formed to have a diameter (first weld width) W1. Further, the irradiation pitch of the laser beam is set to be less than the diameter W1 of the weld beads B1. Thereby, the weld beads B1 are formed to be arranged in order to partially overlap each other all around the circumference of the periphery of the outer cover 16. The first welded portion 50a is formed of the weld beads B1. In each of the corner portions of the outer cover 16, a first weld bead row R1 is formed of the weld beads B1.

Next, the laser beam irradiation device performs the second round of laser welding. In the second round laser welding, the laser beam irradiation device irradiates the laser beam in pulses only on the corner portions of the outer cover 16 and scans the laser beam at a predetermined scanning speed. Thereby, a plurality of circular weld bead B1 are formed along each corner portion of the outer cover 16. Each of the weld beads B1 is formed to have a diameter, for example, the same as the diameter W1 of the weld beads B1 formed in the first round of laser welding. Further, the irradiation pitch of the laser beam is set less than the diameter W1 of the weld beads B1. Thus, a plurality of weld beads B1 are formed to partially overlap each other and form a second weld bead row R2 arranged in an arc manner along each corner portion of the outer cover 16. The second weld bead row R2 is formed to partially overlap the first weld bead row R1, and arranged in the position slightly shifted to an inner side of the first weld bead row R1 in its width direction. By the first weld bead row R1 and the second weld bead row R2, the second welded portion Sob having a width W2 is formed.

As described above, the peripheral portion of the outer cover 16 is welded to the base 12. At the same time, the frame-shaped welded portion 50 including the first welded portion 50a of the width W1 and the second welded portion 50b of the width W2 is formed.

In the manufacturing process of HDD, the air in the housing 10 is exhausted through the vents 46 and 48 after the laser welding described above, and further, through the vents 46 and 48, a low density gas (inert gas) having a density lower than that of air, for example, helium, is introduced in the housing 10 to be enclosed therein. Then, the seal 52 is stuck on the surface of the outer cover 16 to close the vent 48. By the above-discussed processing steps, an enclosed type HDD containing a low-density gas inside is obtained.

According to the magnetic disk drive configured as above and its manufacturing method, the second welded portion 50b having a weld width W2 greater than the weld width W1 of the first welded portion 50a is provided in at least a part of the welded portion 50, and thus the amount of fusion is increased, thereby enhancing the welding strength and joint strength between the outer cover 16 and the base 12. As a result, if the welded portion is brought into contact with an external device or the like during the handling of the magnetic disk drive, it is possible to reduce the risk of damaging the welded portion. Further, according to this embodiment, the second welded portions 50b are provided for the corner portions of the outer cover, which may be relatively easily brought into contact with an external device or the like, and therefore the welded portion can be more effectively protected from and external load.

Thus, according to this embodiment, the joint strength of the welded portion can improved, thereby making it possible to obtain a magnetic disk device which can maintain high airtightness, and its manufacturing method.

Figure 6A:
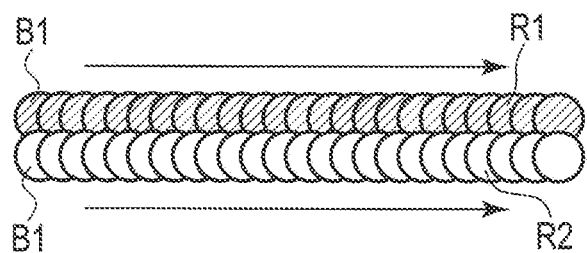
FIG. 6A is a schematic diagram illustrating an example of formation of weld beads.
Figure 6B:
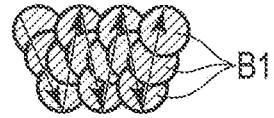
FIG. 6B is a schematic diagram illustrating another example of formation of weld beads.

In this embodiment, the second welded portion 50b is formed by two bead rows, i.e., the first weld bead row R1 and the second weld bead row R2 overlapped with the first weld bead row R1 as shown in FIG. 6A, but the structure is not limited to this. For example, as shown in FIG. 6B, the weld beads B1 may be arranged in a zigzag manner (as the teeth of a saw) to form a wide weld bead row forming a wide second welded portion 50b. Furthermore, here, the second welded portions 50b are provided in the corner portions of the outer cover 16, but they may be provided in other positions, for example, the central portions of the long side, the central portions of the short sides, and the like. In this case as well, it is possible to enhance the joint strength of the welded portion to prevent the damage of the welded portion.

Next, welded portions of an HDD according to modifications will be described. In the following modifications, those parts that are the same as those in the first embodiment will be given the same reference numbers and their detailed explanation will different from the first embodiment will be mainly explained in detail.

First Modification

Figure 7:
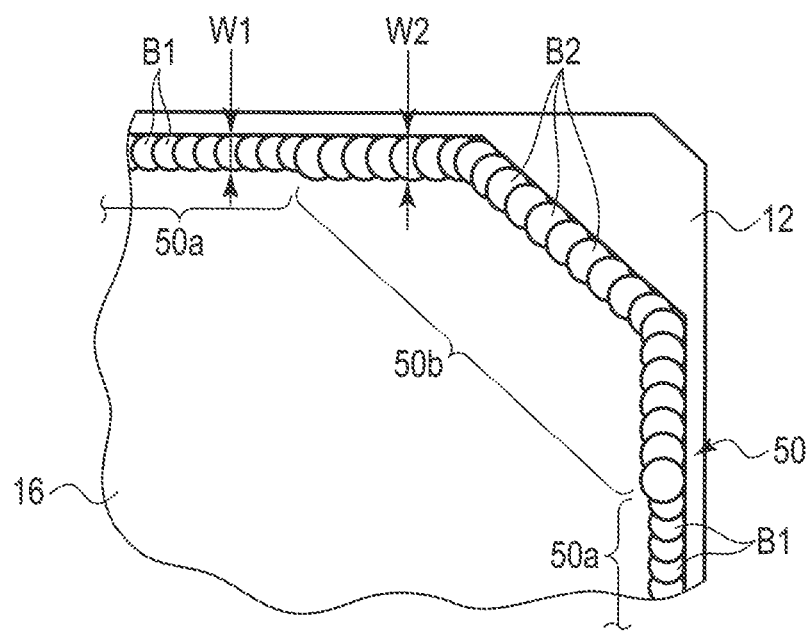
FIG. 7 is a plan view showing a welded portion of the HDD according to the first modification.

FIG. 7 is a plan view showing a welded portion of an HDD according to the first modification. As shown in FIG. 7, according to the first modification, a first welded portion 50a of a welded portion 50 is formed by arranging a plurality of circular first weld beads B1 having a diameter (first weld width) W1 in order so that they partially overlap each other. A second welded portion 50b is formed, for example, along each of corner portions of an outer cover 16. Each second welded portion 50b is formed by arranging a plurality of circular second weld beads B2 having a diameter (second weld width) W2 which is greater than W1 in order so that they partially overlap each other. Such first weld beads B1 and second weld beads 52 which have different diameters can be formed by irradiating laser beams with varied diameters of beam spot onto the outer cover in pulses.

Second Modification

Figure 8:
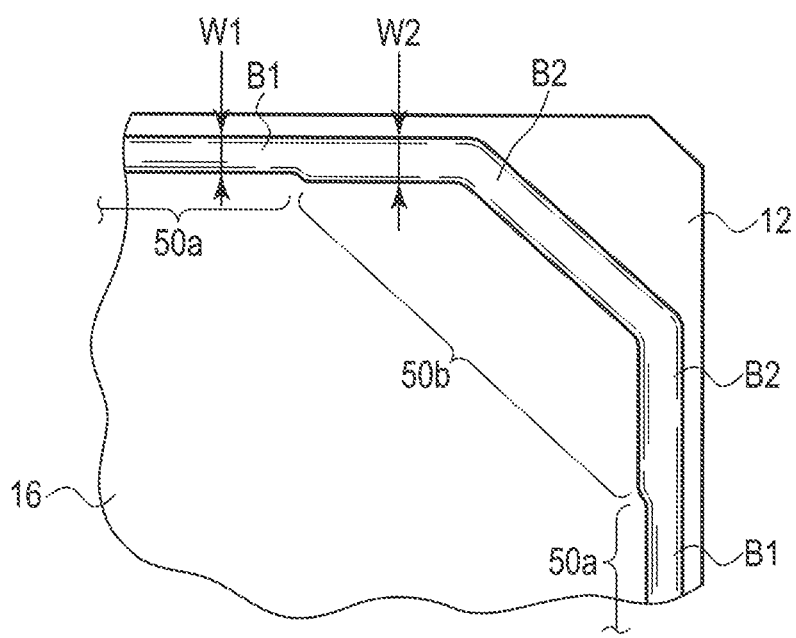
FIG. 8 is a plan view showing a welded portion of the HDD according to the second modification.

FIG. 8 is a plan view showing a welded portion of an HDD according to the second modification. As shown in FIG. 8, according to the second modification, the first welded portion 50a of the welded portion 50 is formed from a stripe-shaped first weld bead B1 having a first weld width W1 and extends continuously. The second welded portion 50b is formed from a stripe-shaped second weld bead B2 having a second weld width W2 (W2>W1) and extends continuously. The first weld bead B1 and second weld bead B2 can be formed by scanning a laser beam along the outer circumferential edge of the outer cover 16 while irradiating the laser beam continuously. In the process of forming the first weld bead B1, the diameter of the beam spot of the laser is set to approximately W1, whereas in the process of forming the second weld bead B2, the diameter of the beam spot of the laser is expanded to approximately W2.

In the first and second modifications described above, an advantageous effect similar to that of the first embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Additionally, for example, the second welded portion may be provided in only one or two corner portions, instead of four corner portions. By preparing a second welded portion in at least one corner portion, the device can exhibit the effect of enhancing the joint strength. The materials, shapes, sizes, etc., of the elements forming the disk drive may be variously changed as needed. In the disk drive, the number of magnetic disks and that of magnetic heads may be increased or decreased as needed, and the size of each of the magnetic disks may be selected from various alternatives.

What is claimed is:
1. A magnetic disk device comprising:
a rotatable disk-shaped recording medium;
a head which processes data on the recording medium; and a housing comprising a base accommodating the recording medium and the head and a cover including a welded portion welded to the base, the welded portion including a first welded portion welded by a first weld width and a second welded portion welded by a second weld width greater than the first weld width;

the second welded portion including a first weld bead row formed of a plurality of weld beads arranged to partially overlap each other, and a second weld bead row formed of a plurality of weld beads arranged to partially overlap each other and partially overlap the first weld bead row.

2. The magnetic disk device of claim 1, wherein the welded portion is formed in a frame shape along a peripheral edge of the cover, and the second welded portion is provided in a corner portion of the cover.

3. The magnetic disk device of claim 2, wherein the second welded portion is provided in the corner portion of the cover, the first weld bead row is provided in a straight line along the corner portion, and the second weld bead row is provided in an arc fashion along the corner portion.

4. The magnetic disk device of claim 2, wherein the first welded portion includes a stripe-shaped weld bead with the first weld width, and the second welded portion includes a stripe-shaped weld bead with the second weld width.

5. The magnetic disk device of claim 2, wherein the second weld bead row is formed at a portion shifted in a width direction of the welded portion with respect to the first weld bead row.

6. The magnetic disk device of claim 5, wherein the second welded portion is provided in the corner portion of the cover, the first weld bead row is provided in a straight line along the corner portion, and the second weld bead row is provided in an arc fashion along the corner portion.

7. The magnetic disk device of claim 2, wherein the first welded portion includes a plurality of circular first weld beads each having a first diameter, arranged to partially overlap each other, and the second welded portion includes a plurality of second circular weld beads each having a second diameter greater than the first diameter, arranged to partially overlap each other.

8. The magnetic disk device of claim 1, wherein the first welded portion includes a stripe-shaped weld bead with the first weld width, and the second welded portion includes a stripe-shaped weld bead with the second weld width.

9. The magnetic disk device of claim 1, wherein the second weld bead row is formed at a portion shifted in a width direction of the welded portion with respect to the first weld bead row.

10. The magnetic disk device of claim 1, wherein the first welded portion includes a plurality of circular first weld beads each having a first diameter, arranged to partially overlap each other, and the second welded portion includes a plurality of circular second weld beads each having a second diameter greater than the first diameter, arranged to partially overlap each other.

11. The magnetic disk device of claim 1, wherein the housing is filled with a low density gas having a density lower than that of air.

12. A magnetic disk device comprising:

a rotatable disk-shaped recording medium;

a head which processes data on the recording medium; and a housing comprising a base accommodating the recording medium and the head and a cover including a welded portion welded to the base and extending along a peripheral edge of the cover in a frame-shape with corner portions;

wherein regions of the welded portion other than the corner portions have a first weld width, and at least one of corner portions of the welded portion has a second weld width greater than the first weld width, and the at least one of the corner portions of the welded portion includes a first weld bead row and a second weld bead row which partially overlaps the first weld bead row.

13. The magnetic disk drive of claim 12, wherein the first weld bead row includes a plurality of weld beads arranged to partially overlap each other, and the second weld bead row includes a plurality of weld beads arranged to partially overlap each other and partially overlap the first weld bead row.

* * * * *